Patented Feb. 11, 1941

2,231,328

UNITED STATES PATENT OFFICE 2,231,328

COLLOIDAL SUSPENSION

Ogden Fitz Simons, Warren, Pa., assignor to Floridin Company, Warren, Pa., a corporation of Delaware No Drawing. Application November 20, 1940, Serial No. 366,476

12 Claims. (Cl. 255—1)

The present invention relates to a new and improved method of producing a colloidal clay suspension which may be used as a drilling mud and for various other purposes. The application is a continuation-in-part of my allowed copending application Serial No. 128,027, filed February 26, 1937.

In the drilling of wells, the cuttings released by the drill are usually removed by introducing drilling mud into the well. This fluid must have several properties; e. g., a high viscosity, so as to carry with it the rock cuttings from the well, and also so that it will hold in suspension various weighing mediums, such as finely ground barytes or iron oxide. It should also possess thixotropic properties; that is, when circulation is stopped, the fluid must form a gel so that the cutting already in suspension will not settle out, for example, during periods when the bit is being changed.

Various methods and means have heretofore been employed for providing an aqueous mixture to remove the cuttings from wells through which the drill is bored. Thus, in the Cross et al. Patent 2,044,758, dated June 16, 1936, there is disclosed an aqueous suspension composition which includes a brine having suspended therein from one to ten percent of fuller's earth of the Florida-Georgia type. This patent states that the composition may be mixed by the apparatus and method of dispersing particles as shown in the Cross Patent 2,044,757, dated June 16, 1936. It will be noted that in the Cross apparatus it is necessary either to ship the bulky drilling mud in the water suspension to the well or to install an apparatus at the well for the production of this suspension.

An important object of the present invention is to provide a simple, efficient and economical method of producing a colloidal clay suspension which may be used with or without a saline material or brine, and which may be produced at the well from dry earth with minimum expenditure of time and labor.

If fuller's earth is dried at a low temperature and then reduced to granular form and placed in water, this mixture will slime slightly on the upper surface or outside, but will retain its granular structure unless subjected to high speed mixing for an extended period or passing the suspension through a colloid mill or jetting the suspension under high pressure, or other drastic treatment. In my improved method of producing a colloidal clay suspension, the moist, natural fuller's earth is first pressure treated, preferably by extrusion before being dried, so as to be subjected to pressure sufficient to rupture the original structure of the clay and thus cause each particle to move or slip to a new position relative to the other colloidal particles. The sufficiency of the pressure in respect to rupturing the clay structure and causing movement of the particles relative to one another is readily determinable. While this pressure may vary with different clays, it can be determined in respect to any particular clay by comparison of the viscosity of a colloidal suspension prepared from the extruded clay as compared to the viscosity of the same percentage of suspension produced from the same clay which has not been extruded. The fuller's earth is subjected to pressure sufficient to rupture the original structure of the earth. Ordinarily, this can be accomplished by extruding the earth through an auger-type extrusion machine under a pressure substantially in excess of 100 pounds per square inch as measured at the die plate. A suitable apparatus for subjecting the earth to extrusion pressure is illustrated, for example, in the patent to Hartshorne No. 2,079,854, granted May 11, 1937. It will, of course, be manifest that this pressure may vary in accordance with the particular kind of clay being worked.

I have found, that ordinarily extrusion pressures ranging from 100 up to 500 pounds per square inch give quite satisfactory results and that pressures substantially in excess of 600 pounds per square inch are not justified, since the improvement obtained is small, compared with the increased cost. The most convenient type of pressure treating equipment is an auger extrusion machine of the character disclosed in the above identified Hartshorne patent. In such a machine, using a clay of uniform consistency, pressures are ordinarily controlled or regulated by the number and size of the openings in the die plate and by the thickness of the die plate. When the pressure is increased by decreasing the size or number of the openings, or by thickening the die plate, increasing percentages of the clay flow back between the auger and the wall of the extrusion cylinder until finally a point can be reached where little or no flow of material is used from the machine. It is obviously desirable, therefore, to regulate the pressure so that while obtaining the result desired, there is a suitable flow from the machine.

It is believed that the ultimate particles of Florida-Georgia fuller's earth have one or more dimensions vastly greater than the other dimensions. These particles which may be likened to bundles of rods or pencils, or in accordance with other theories to bundles of flat plates, are held together by varying degrees of cohesive force. By subjecting the earth to extrusion shearing forces, the bundles are slipped or broken apart along various shear planes. It is desirable to use pressures which will cause sufficient shearing to substantially enhance the colloidal properties of the earth and generally speaking the higher the pressure, the larger the number of shear-planes that are formed. I find that generally subjecting Florida earth containing in the neighborhood of 52% free water to pressures of from 50 to 300 pounds per square inch effects a very substantial enhancement in the earth's colloidal properties.

The pressure treated clay is then dried preferably at temperatures substantially below 600° F. and reduced to the desired granular form. In fact, the best results are obtained when this material is dried at temperatures around 200° F. The granulated clay is then placed in water in proper proportions of each, depending upon the character or type of the clay and the particular constituents of the earthy material where the well is to be drilled. Granulated clay so treated will slake readily when mixed with water, so that a satisfactory supension is obtained by less drastic treatment of the suspension and ordinary simple mixing will be found satisfactory. Thus, it is not necessary to finely grind the clay and subject it to air flotation, as has previously been the case in preparing drilling muds from Florida-Georgia fuller's earth but simple grinding is sufficient, thereby effecting a considerable saving in grinding costs. The colloidal suspension thus formed constitutes a smooth, viscous non-flocculant, gelatinous mixture in which the colloidal particles are free from agglomeration or agglutination.

To this mixture may be added, if desired a suitable brine or salts as a medium of producing a stable clay suspension.

I have found that the clay may be extruded and then subsequently dried and when resuspended in water, certain original advantages of extrusion are maintained. While it would be expected that on drying, the effect of extrusion would be lost, it is an unexplained fact to find that this is not the case and that an unexpected improved result is effected due to the fact that a higher percentage of earth particles are separated on material that has been previously extruded and dried as compared to material that has not been so treated.

It might be noted that the lower the temperature of drying, the more gel-like is the emulsion or suspension that is formed. Moreover, the lower the temperature, the less combined moisture is removed from the clay and thus the more gel like the suspension that is subsequently formed when the water is added to the clay. Consequently, as indicated in the example hereinafter given, I prefer temperatures very substantially below 600° F. Although different earths will react somewhat differently to temperatures between 100° F. and 600° F., it is preferable that the temperature treatment be nearer 100° F., as shown in the following example, than 600° F.

For most earths of the Georgia-Florida type from which are produced 6% suspensions, for example, I find that the optimum drying temperature is in the neighborhood of 200° F., and that when the temperature substantially exceeds 250° F., there is a marked and rapid decrease in the effect obtained by extrusion. Consequently, it is desirable that the temperature of drying be substantially below 600° F., and in the neighborhood of 200° F. if one is to avoid sacrificing the advantages of extrusion. At 600° F. a gel-like emulsion is no longer obtained when the clay is suspended in water, and once the material is dried at temperatures in excess of 600° F., there is no way to make the action reversible and obtain the gel which had been destroyed by heating to this temperature.

I have found that if the clay is pressure treated by extrusion before drying, it not only will break down into a colloidal suspension from a granular form, but even when ground to a fineness in excess of 200 mesh (200 openings per linear inch) it will produce a more efficient colloidal suspension than can be obtained by untreated clay, similarly ground. As an example, two samples of fuller's earth were taken from two different mines at Quincy, Florida, and a portion of each was extruded. All four samples were then dried under a hot air blast at 100° F. and reduced to pass 200 mesh. A mixture was then made up in a 4% solution and the viscosity determined in a Stormer viscometer. The samples were further treated with a 2½% solution of calcium hydroxide which is the preferred brine used in my method of producing the colloidal clay suspension. It is realized that drilling mud exhibits plastic flow, and hence the viscosity is a function of the rate of shear. However, the results are comparable, since the various drilling muds were tested under identical conditions and the rate of shear was maintained constant by operating the Stormer viscometer at 600 R. P. M. The results in centipoises under these condtions were as follows:

|  | 4% in distilled water | 4% in water and treated with 2½% $Ca(OH)_2$ |
|---|---|---|
|  | Centipoises | Centipoises |
| Florida earth mine A—untreated | 3 | 19 |
| Florida earth mine A—pressure treated | 9 | 44 |
| Florida earth mine B—untreated | 3 | 30 |
| Florida earth mine B—pressure treated | 8 | 48 |

The table clearly indicates that pressure-treated clay when made into a suspension in water, breaks down into a much finer particle size than can be obtained by fine grinding. Moreover, it will be noted that 200 and finer mesh material from mine A when placed in water, gave a viscosity of only 3 centipoises, whereas the same material pressure treated, gave a viscosity of 9 centipoises, under identical conditions.

The deposit from mine A was considerably better than that from mine B. However, it will be observed from the foregoing table, that the samples of untreated clay from both mines when mixed with distilled water have the same centipoise viscosity, and when pressure treated, the clay from mine A is a point higher than that from mine B. Further, that when brine is added, the untreated clay from mine A has a viscosity of 19 centipoises as compared to 30 centipoises from mine B. When the same clays were pressure treated that from mine A rose to 44 centipoises while that from mine B registered a viscosity of 48 centipoises. In other words, by reason of my improved method, clay deposits which would ordinarily prove unsatisfactory for suspension purposes, may be reclaimed or treated to provide a very efficient drilling mud, which settles out only with the greatest of difficulty. As the colloidal suspension may be produced at the well by the simple expedient of mixing the clay with water, in the proper proportions of each, and then agitating the mixture, it will obviate the necessity of installing an expensive apparatus either at the well or at a point remote therefrom to produce the drilling mud.

The aqueous mixture, if desired, may have introduced therein any suitable saline material or brine as a medium for suspension of the clay such as calcium hydroxide. However, in certain types or character of clay, it will not be necessary to treat the mixture with a brine.

For ordinary practical purposes, the colloidal suspension constituting the mixture may be composed of 4 parts of fuller's earth or zeolitic clay and 96 parts of water by weight. This proportion, of course, may be varied depending upon the character of the clay and the constituents of the earthy material where the drilling operation is to be performed.

The effects of extrusion on viscosity of fuller's earth suspension have been carefully calibrated with a Stormer viscometer. As a result, it has been established that ordinary unextruded clay shows no increase in viscosity after a long time stirring in an ordinary mixer. When the suspension was transferred to a high speed mixer operating at about 15,000 R. P. M., it resulted in a further increase in the viscosity. When extruded fuller's earth is similarly treated, the results are substantially the same except that the viscosity increases and has uniformly higher values than the unextruded material, thus conclusively establishing that extruding the clay accomplishes results which cannot be obtained by subjecting the suspension to high speed mixing. While it would appear that equal viscosities could be obtained by long time mixing of extruded clay and unextruded clay when subjected to high speed mixing for extremely long periods of time, it has been empirically established that such is not the case and that the extruded material attains higher viscosity than the unextruded clay.

Tests have further been conducted to determine the effect of activation temperature on viscosity in which extruded Florida fuller's earth was mixed in a suspension in which the viscosity of a 6% suspension of Florida fuller's earth when extruded, dried, ground, and activated, were subjected to burning temperatures between 0 and 600° F. These tests show that a maximum viscosity of between 80 and 90 centipoises is obtained at temperatures in the neighborhood of 200° F., and that as the temperature increases the viscosity proportionately decreases.

Thus, it will be seen that my improved method permits the production of a colloidal clay suspension in which the colloidal properties of fuller's earth is increased from ten percent to three hundred percent measured in terms of viscosity of the aqueous suspension and that the degree of improvement varies in accordance with the particular fuller's earth which is being treated or processed.

Heretofore, fuller's earth from only certain mines and possessing certain characteristics has been suitable for producing an aqueous suspension to be used in drilling muds and the like. By reason of the present invention clays from practically all mines can be employed satisfactorily and rendered suitable for use as colloidal suspensions.

While it was known prior to my invention that the extrusion of fuller's earth as shown for example in the Hartshorne Patent No. 2,079,854, enhances the absorptive efficiency of fuller's earth, it was not known that when the colloidal properties of fuller's earth are improved by extrusion, such extruded earth may be dried without destroying or substantially reducing the colloidal properties of the suspension so obtained. Moreover, it was not previously known that an aqueous suspension might be obtained from such extruded earth and that when dried, the product so obtained retains its colloidal properties and may be reconverted without further extrusion to an aqueous suspension having colloidal properties of the same order as those initially obtained.

While it might ordinarily be expected that the extruded earth when subsequently dried would cause a reduction in the colloidal properties of the suspension, it has been empirically shown that the drying when conducted in accordance with my process, does not appreciably reduce the colloidal properties of the earth.

It was previously known that fuller's earth when squeezed and kneaded for a suitable period of time in the presence of water will enhance its colloidal properties. However, in such treatment it has been assumed that when the water is removed, the particles will coalesce and may not then be readily suspended without further squeezing and kneading. When the fuller's earth is extruded and treated to obtain a colloidal suspension as called for in the present invention, the time factor is unimportant, and the pressure is the controlling and essential factor. Thus, it will be seen that subjecting the clay to a rolling, kneading and squeezing action before drying does not obtain the same desirable results as is effected by extruding the clay, since the rolling, kneading and squeezing action will not permit the fuller's earth when subsequently dried, to be resuspended without being re-extruded, and therefore will not produce a suspension having a viscosity of the same order as that originally obtained and as produced by my method.

The minute particle size resulting from making a colloidal suspension out of pressure treated clay may be utilized to obtain a very fine and impalpable powder by spray drying the colloidal suspension. By this treatment, a much finer mesh can be obtained than by the usual mechanical grinding or reducing means. Since the powder has a very high specific surface, it may be efficiently used as a filler in the composition of various products such as rubber, and to replace in part, carbon black and zinc oxide.

For certain purposes, it is desired that the particles or powder will not produce a gel when mixed with water. In such a case, this may be obtained by drying the material either during the spray drying operation or subsequent to it in another operation, at temperatures above 600° F., thus forming a very finely divided clay that will not gel with water. Such a produce may be used in the precipitating bath into which filaments of a cellulose solution are being dispersed and in general, may replace infusorial earth for many of the purposes for which such earth may be used.

It is to be understood that the foregoing method of producing the colloidal clay suspension is merely illustrative of a preferred embodiment, and that such changes may be made as fall within the purview of one skilled in the art

I claim:

1. An improved method of producing a colloidal clay suspension for use as a drilling mud which consists in subjecting fuller's earth to pressure sufficient to rupture the original structure of the earth, drying the pressure treated earth at a temperature substantially below 600° F., reducing the earth to granular form, mixing the granular earth with water, and agitating the mixture to provide a drilling mud.

2. An improved method of producing a colloidal clay suspension for use as a drilling mud, which consists in subjecting fuller's earth to pressure sufficient to rupture the original structure of the earth so as to cause each particle to move into a new position relative to the other particles, drying the pressure treated earth at a temperature substantially below 600° F., reducing the earth to granular form, mixing the granular earth with water, and agitating the mixture to provide a drilling mud which does not easily settle out.

3. An improved method of producing a colloidal clay suspension for use as a drilling mud which consists in subjecting natural moist fuller's earth to pressure sufficient to rupture the original structure of the earth so as to cause each particle to move into a new position relative to the other colloidal particles, drying the pressure treated earth at a temperature substantially below 600° F., reducing the heated earth to granular form, mixing the granular earth with water, and agitating the mixture to provide a drilling mud.

4. An improved method of producing a colloidal clay suspension for use as a drilling mud which consists in subjecting natural moist fuller's earth of the Georgia-Florida type to extrusion under pressure sufficient to rupture the original structure of the clay so as to cause each particle to move into a new position relative to the other colloidal particles, drying the pressure-treated clay at a temperature substantially below 600° F., reducing the heated clay to granular form, mixing the granular clay with water, adding brine or salts to the mixture to produce a stable clay suspension, and agitating the mixture to provide a drilling mud which does not easily settle out.

5. The improved method of preparing a material for a colloidal suspension which consists in subjecting fuller's earth to pressure under extrusion, drying the pressure treated earth at a temperature not exceeding 250° F., and then reducing the dried earth.

6. An improved method of producing a colloidal clay suspension which consists in subjecting fuller's earth to pressure sufficient to substantially increase the viscosity of the colloidal suspension as compared with an untreated earth suspension, drying the pressure treated earth at a temperature in the neighborhood of 200° F., reducing the earth to granular form, mixing the granular earth with water, and agitating the mixture.

7. An improved method of producing a colloidal clay suspension which consists in subjecting fuller's earth to pressure sufficient to substantially increase the viscosity of the colloidal suspension as compared with an untreated earth suspension, and suspending the earth with water.

8. An improved method of producing a colloidal clay suspension which consists in subjecting fuller's earth having substantially all of its natural moisture to extrusion under pressure sufficient to rupture the original structure of the clay and change the positions of the colloidal particles, and drying the pressure treated clay at a temperature substantially below 600° F.

9. An improved method of producing a colloidal clay suspension which consists in subjecting fuller's earth having substantially all of its natural moisture to extrusion under pressure sufficient to rupture the original structure of the clay and change the positions of the colloidal particles, drying the pressure treated clay at a temperature substantially below 600° F., mixing the clay with water, and agitating the mixture to provide a colloidal clay suspension of substantially increased viscosity as compared with the viscosity of a clay suspension prepared from the same clay which is not extruded.

10. An improved method of producing a colloidal clay suspension which consists in subjecting fuller's earth having substantially all of its natural moisture to extrusion under pressure sufficient to rupture the original structure of the clay and change the positions of the colloidal particles, drying the pressure treated clay at a temperature in the neighborhood of 200° F., reducing the clay, mixing the reduced clay with water, and agitating the mixture to provide a colloidal clay suspension of substantially increased viscosity as compared with the viscosity of a clay suspension prepared from the same clay which is not extruded.

11. The improved method of preparing a material for a colloidal suspension, which consists in subjecting fuller's earth to pressure sufficient to rupture the original structure of the clay and change the positions of the colloidal particles, mixing the earth with water to provide a colloidal clay suspension of substantially increased viscosity as compared with the viscosity of a suspension prepared from the same clay which is not extruded, and then spray-drying the suspension.

12. As a new article of manufacture, dry fuller's earth which has been subjected to extrusion while under pressure on the material sufficient to increase in excess of 50% its colloidal properties measured in terms of the viscosity of a 4% aqueous suspension prepared therefrom as compared to a 4% aqueous suspension of the same earth which has not been extruded.

OGDEN FITZ SIMONS.